(12) United States Patent
Kitada et al.

(10) Patent No.: US 9,582,654 B2
(45) Date of Patent: Feb. 28, 2017

(54) MOBILE DEVICE, AND AUTHENTICATION PROGRAM

(71) Applicant: Murata Manufacturing Co., Ltd., Nagaokakyo-shi, Kyoto-fu (JP)

(72) Inventors: Hiroaki Kitada, Nagaokakyo (JP); Hidekazu Kano, Nagaokakyo (JP); Takafumi Inoue, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/070,519

(22) Filed: Mar. 15, 2016

(65) Prior Publication Data

US 2016/0196421 A1  Jul. 7, 2016

Related U.S. Application Data

(63) Continuation of application No. PCT/JP2014/075987, filed on Sep. 30, 2014.

(30) Foreign Application Priority Data

Oct. 4, 2013  (JP) .................................. 2013-208984

(51) Int. Cl.
*H04M 3/00* (2006.01)
*G06F 21/36* (2013.01)
(Continued)

(52) U.S. Cl.
CPC ............ *G06F 21/36* (2013.01); *G06F 3/0414* (2013.01); *G06F 3/0416* (2013.01);
(Continued)

(58) Field of Classification Search
CPC ............ G06F 1/32; G06F 2203/04105; G06F 3/0488; G06F 3/04886; H04M 1/673;
(Continued)

(56) References Cited

U.S. PATENT DOCUMENTS 6,509,847 B1  1/2003  Anderson
8,136,053 B1 *  3/2012  Miller ................. G06F 3/04883
345/156

(Continued)

FOREIGN PATENT DOCUMENTS

EP    2463798 A1   6/2012
JP    2202328903 A  11/2002
(Continued)

OTHER PUBLICATIONS

International Search Report for PCT/JP2014/075987 date of mailing Dec. 16, 2014.

(Continued)

*Primary Examiner* — Charles Shedrick
(74) *Attorney, Agent, or Firm* — Arent Fox LLP (57) ABSTRACT

A mobile device includes a housing, a sensor and a deformation detecting IC which detect deformation of the housing, a memory which stores a pattern database in which patterns of the deformation of the housing are registered in advance, and an authentication unit which performs authentication based on whether or not the deformation of the housing detected by the sensor and the deformation detecting IC corresponds to a pattern registered in the pattern database.

19 Claims, 9 Drawing Sheets

(51) Int. Cl.
*G06F 21/31* (2013.01)
*H04W 12/06* (2009.01)
*G06F 3/041* (2006.01)
*H04W 12/08* (2009.01)
*G06F 3/0488* (2013.01)

(52) U.S. Cl.
CPC .......... *G06F 3/04883* (2013.01); *G06F 21/31* (2013.01); *H04W 12/06* (2013.01); *H04W 12/08* (2013.01); *G06F 2203/04105* (2013.01)

(58) Field of Classification Search
CPC ......... H04M 2250/12; H04M 2250/22; H04W 52/027; H04W 52/0274
USPC .................... 345/173–177; 455/418
See application file for complete search history.

(56) References Cited

U.S. PATENT DOCUMENTS

| | | | |
|---|---|---|---|
| 8,760,414 B2* | 6/2014 | Kim | G06F 1/1624 |
| | | | 345/1.1 |
| 2009/0085889 A1* | 4/2009 | Hyeon | G06F 3/0202 |
| | | | 345/174 |
| 2010/0099394 A1* | 4/2010 | Hainzl | G06F 1/32 |
| | | | 455/418 |
| 2014/0035794 A1* | 2/2014 | Chen | G06F 3/1431 |
| | | | 345/1.3 |
| 2014/0218314 A1* | 8/2014 | Kim | G06F 1/1654 |
| | | | 345/173 |
| 2015/0035770 A1* | 2/2015 | Lee | G06F 3/041 |
| | | | 345/173 |

FOREIGN PATENT DOCUMENTS

| | | |
|---|---|---|
| JP | 2012014401 A | 1/2012 |
| JP | 2013097767 A | 6/2013 |
| WO | WO 2011125408 A1 | 10/2011 |

OTHER PUBLICATIONS

Written Opinion for PCT/JP2014/075987 date of mailing Dec. 6, 2014.

* cited by examiner

MOBILE DEVICE, AND AUTHENTICATION PROGRAM

CROSS REFERENCE TO RELATED APPLICATIONS

The present application is a continuation of International application No. PCT/JP2014/075987, filed Sep. 30, 2014, which claims priority to Japanese Patent Application No. 2013-208984, filed Oct. 4, 2013, the entire contents of each of which are incorporated herein by reference.

TECHNICAL FIELD

The present invention relates to a mobile device which performs authentication in response to reception of an operator's operation, and an authentication program.

BACKGROUND ART

Mobile devices such as mobile telephones each include a mechanical key input unit to which numbers such as 0 to 9 and characters are allocated, and a touch panel which displays a software keyboard. Such mobile devices perform authentication processing when the mobile device is activated or executes software in some cases.

According to the authentication processing of a typical mobile device, an operator is generally authenticated by inputting a passcode using a key input unit and the touch panel. Further, according to the authentication processing of each mobile device, an operator undergoes authentication by using an operation pattern of each mobile device.

For example, a mobile device disclosed in Japanese Patent Application Laid-Open No. 2002-328903 detects a time interval and a pressing force of an operation of each key as an operation pattern when an operator inputs a passcode by operating a mechanical key input unit, and performs authentication according to whether or not a combination of the passcode and the operation pattern corresponds to a pattern registered in advance.

A mobile device disclosed in Japanese Patent Application Laid-Open No. 2012-014401 detects as an operation pattern a combination of a time interval in which a finger touches a touch panel and a time interval in which the finger is moved away from the touch panel, and performs authentication according to whether or not the detected operation pattern corresponds to a pattern registered in advance.

SUMMARY OF THE INVENTION

According to conventional authentication processing of A mobile device, an operator needs to move his or her finger around and/or apart from a key input unit or a touch panel, and therefore there is a concern that another person can view the user's finger motion to guess his or her operation pattern. To prevent another person from reading the pattern, it is necessary for the operator to enter his or her operation pattern while hiding the mobile device, for example, by using one of his or her hands or by placing the mobile device in his or her pocket. Therefore, an operation which each operator performs to undergo authentication becomes complicated.

It is therefore an object of the present invention to provide a mobile device which can prevent an operation pattern from being read by other people based on a finger motion of an operator who undergoes authentication, and an authentication program therefore.

According to the present invention, a mobile device includes:
 a housing;
 a sensor that detects a pressing pattern input by an operator of the mobile device by varying the force at which the operator presses one or more surfaces of the housing over time;
 a memory storing an authenticating pressing pattern;
 a comparator for determining whether a pressing pattern entered by the operator corresponds to the stored authenticating pressing pattern.

The sensor preferably detects the pressing pattern by detecting the pressing force applied by the operator at each of a plurality of time instants. In order to assist in this operation, the mobile device further includes means for providing an indication to the operator of the timing of the time instants.

The housing of the mobile device preferably includes a cover glass and the sensor detects the pressing pattern applied to the cover glass by the operator. The housing includes at least major front and rear surfaces, with the cover glass being located on the front surface. The sensor preferably includes a first sensor for detecting the pressing pattern applied to the cover glass and a second sensor for detecting the pressing patter applied to the rear main surface of the housing. In the preferred embodiment, the housing further includes at least two side surfaces connecting the front surface to the rear surface. In one embodiment, the sensor detects the pressing pattern applied to one or more of the side surfaces. In another embodiment, the sensor detects the pressing pattern applied to two or more of the housing surfaces.

The sensor preferably includes a piezoelectric film which deforms in response to the pressing operation of the operator. The piezoelectric film is preferably made of a chiral polymer.

The mobile device preferably includes a function restricting unit which restricts the operation of the mobile device until the pressing pattern input by the operator is determined to correspond to the stored authentication pressing pattern. The function of the mobile device is restricted to operations associated with the entry of the predetermined pattern and the determination of whether the entered pattern corresponds to the stored authentication pressing pattern.

In the preferred embodiment, the mobile device comprises: a first wireless communication unit which performs a first wireless communication, a second wireless communications unit which performs a second wireless communication, and a router which routes a communication signal between the first and second wireless communication units. The function restricting unit preferably restricts operations of the first and second wireless communication units and the router, lifts the restrictions when the pressing pattern input by the operator is determined to correspond to the stored authentication pressing pattern and maintains the restriction when the pressing pattern input by the operator is determined not to correspond to the stored authentication pressing pattern The invention is also directed towards a non-transitory computer readable medium having a program stored thereon which, when run on a processor associated with a mobile device having housing, a sensor for detecting a pressing pattern with which the housing is pressed by an operator and a memory storing an authenticating pressing pattern, causes the processor to determine whether a pressing pattern entered by the operator by pressing the housing with a varying degree of force over a time period corresponds to the stored authenticating pressing pattern, and, if so, enable a normal operation of the mobile device. The program allows the sensor to detect the pressing pattern by detecting the pressing force applied by the operator at each of a plurality of time instants.

The authenticating pressing pattern indicates the pressing force at each of the plurality of consecutive time instants. The program also preferably causes the processor to provide an indication to the operator of the timings of the time instants at which the operator should enter individual values of the pressing pattern. The pressing pattern preferably comprises a plurality of individual presses, the force of each press being determined at a respective time instant.

According to this configuration, an operator can undergo authentication by, for example, changing the degree of a force with which he or she presses one or more surfaces of the housing according to a predetermined pattern, and does not need to move his or her fingers from the position on which it presses against the housing. Consequently, it is possible to prevent another person from reading an operation pattern based on the finger motion of the operator. Further, the mobile device does not need to provide an indication for guiding the operator's finger position when undergoing authentication.

Preferably, the pattern stored in the memory unit relates to a temporal change of a deformation amount of the housing (i.e., how the deformation changes over time). According to this configuration, it is possible to enhance the security level of authentication processing.

Preferably, the deformation detecting unit includes a piezoelectric film which deforms in response to the deformation of the housing. The piezoelectric film is preferably made of a chiral polymer. According to this configuration, the operator can undergo authentication by performing an operation of pushing the housing using his or her finger. Further, the piezoelectric film whose main material is chiral polymers can generate an output without an influence of pyroelectricity, i.e., can obtain an output without an influence of a temperature change at a detection position. Consequently, it is possible to precisely detect deformation of the housing without an influence caused by heat transfer from the finger or an influence caused by heat generation in the housing.

Preferably, the housing has a flat rectangular shape, and the deformation detecting unit detects deformations of two opposing outer surfaces of the housing. According to this configuration, even when the operator grips the housing without knowing which of the two main surfaces are the front and rear surfaces of the housing, the operator can undergo authentication by pressing (deforming) at least one of the outer surfaces of the housing.

Preferably, the mobile device further includes a notification control unit which notifies the operator of a predetermined time instants at which he or she should enter the authenticating pattern. The authentication unit detects the pattern in which the operator deforms the housing (as detected by the deformation detecting unit) at each of these time instants, and compares that pattern with an authenticating pattern stored in the memory unit. According to this configuration, by adequately changing the degree of a force used to deform the housing during at each of the predetermined time instants, the operator can deform the housing according to a pattern matching the authenticating pattern registered in advance in the mobile device and thereby authenticate his or herself.

According to the present invention, an operator can undergo authentication by changing the degree of a force he or she applies to the housing while keeping his or her finger in contact with a housing, and deforming the housing according to a predetermined authenticating pattern.

DESCRIPTION OF THE PREFERRED EMBODIMENTS

A mobile device according to the first embodiment of the present invention will be described with reference to the drawings.

Figure 1:
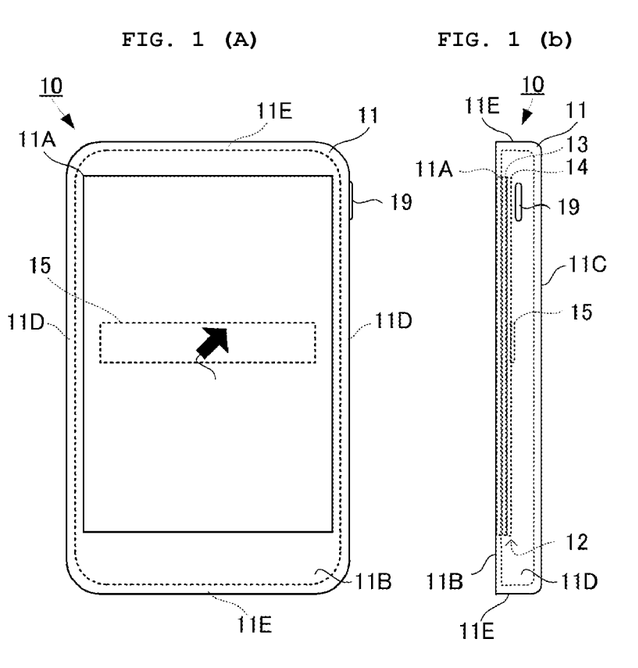
FIGS. 1(A) AND 1(B) are a plan view and a side view, respectively, of a mobile device according to a first embodiment of the present invention.

FIG. 1(A) is a plan view of the mobile device according to the first embodiment of the present invention and FIG. 1(B) is a side view of the mobile device according to the first embodiment of the present invention.

A mobile device 10 according to the present embodiment is preferably a smartphone terminal having a size which can be gripped by an operator, and includes a housing 11, a touch panel 12 and a mechanical switch 19. In addition, although not illustrated herein, the mobile device 10 includes other hardware such as a CPU, a memory, a communication circuit, an image processing circuit, an audio processing circuit, a circuit substrate and the like.

The housing 11 preferably has a flat rectangular shape whose length and width are larger than its thickness, and includes an internal space. The housing 11 includes a cover glass 11A, a front plate 11B, a back plate 11C, a pair of side plates 11D and a pair of side plates 11E. The front plate 11B, the back plate 11C, the side plates 11D and the side plates 11E are preferably made of a hard organic material such as ABS or PC, and are formed to be dividable at optional positions. The front plate 11B and the back plate 11C each have rectangular shape seen from a front view (plan view), and the front plate 11B is provided with a rectangular opening in which the cover glass 11A is fitted. The cover glass 11A is preferably translucent, and is fitted to the opening of the front plate 11B. A pair of side plates 11D are provided to extend along long sides of the front plate 11B and the back plate 11C, respectively. A pair of side plates 11E are provided to extend along short sides of the front plate 11B and the back plate 11C, respectively. A pair of the side plates 11D and a pair of side plates 11E are formed in shapes continuing along outer circumferences of the front plate 11B and the back plate 11C. In the side plate 11D, an opening to which the mechanical switch 19 is provided is formed. The mechanical switch 19 is provided to be exposed from the opening provided to the side plate 11D.

The touch panel 12 is preferably pasted in a sealed state at a back side of the cover glass 11A and is located in the internal space of the housing 11 such that, when an arbitrary position of the cover glass 11A is pressed by a user's finger or the like, the touch panel 12 deforms together with the cover glass 11A. The touch panel 12 includes a capacitive sensor 13, a display unit 14 and a pressing sensor 15. In this regard, on the touch panel 12, the capacitive sensor 13, the display unit 14 and the pressing sensor 15 are disposed in order from the side of the cover glass 11A.

The capacitive sensor 13 has a structure in which capacitive detecting electrodes are formed on opposed principal surfaces of a dielectric substrate, faces the cover glass 11A, and causes a local change in a capacitance when an operator touches the cover glass 11A.

The display unit 14 includes a liquid crystal display panel or an organic EL display panel, and displays an image on the cover glass 11A as a display surface.

The pressing sensor 15 has press detecting electrodes formed on opposed surfaces of a piezoelectric film made of polyvinylidene fluoride (PVDF), poly-L-lactic acid (PLLA) or the like. This pressing sensor 15 is deformed together with the cover glass 11A when the operator's finger presses the cover glass 11A to produce electric charges between the press detecting electrodes. In this regard, the pressing sensor 15 is arranged such that long sides seen from the front view lie along short sides of the housing 11 and short sides seen from the front view lie along long sides of the housing 11. In addition, the pressing sensor 15 may be arranged such that the long sides seen from the front view lie along the long sides of the housing 11 and the short sides seen from the front view lie along the short sides of the housing 11.

More preferably, the pressing sensor 15 is formed by a piezoelectric film made of chiral polymers such as PLLA, and is stretched in a stretching direction indicated by a black arrow in FIG. 1(A). Chiral polymers such as PLLA have a main chain which adopts a spiral structure, and exhibits piezoelectricity when the chiral polymers are uniaxially stretched and molecules are oriented. More specifically, the chiral polymers exhibit piezoelectricity expressed by a piezoelectric tensor component d14 when a thickness direction of the piezoelectric film is a first axis and a stretching direction of the piezoelectric film is a third axis. A relative permittivity of the PLLA is about 2.5 and very low, and therefore a piezoelectric output constant (=piezoelectric g constant) belongs to a group of high constants among polymers. Consequently, the PLLA can provide the same detection sensitivity as that of the PVDF, for example.

Further, the piezoelectric film is formed in a band shape such that long sides of the film extend in an angular direction (e.g., a direction of 45 degrees) intersecting the stretching direction indicated by a black arrow in FIG. 1(A). Thus, the piezoelectric film made of chiral polymers can detect deformation which deflects the piezoelectric film in its thickness direction instead of deformation which twists the piezoelectric film. Alternatively, when the stretching direction of the piezoelectric film is arranged in parallel to a rim of an exterior edge of the housing 11, the piezoelectric film made of chiral polymers can detect deformation which twists the piezoelectric film.

In addition, the stretching ratio for the piezoelectric film made of chiral polymers is preferably about three to eight times. Applying heat processing after the stretching encourages crystallization of extended chain crystal of chiral polymers, and increases a piezoelectric constant. In addition, when a film is biaxially stretched, it is possible to provide the same effect as that of the uniaxial stretching by varying stretching ratios of respective axes. When, for example, a film is stretched eight times in a given direction serving as an X axis, and the film is stretched two times in a Y axis direction orthogonal to the X axis, it is possible to provide for a piezoelectric constant the substantially same effect as that obtained when the film is uniaxially stretched four times in the X axis direction. A simply uniaxially stretched piezoelectric film is likely to break along a stretching axis direction, and therefore it is possible to increase a strength to some degree by biaxially stretching the film as described above.

Further, the piezoelectric film made of chiral polymers produces piezoelectricity simply by orientation processing of molecules such as stretching, and does not need to be subjected to polling processing that are required when other polymers such as PVDF or piezoelectric ceramics are used. That is, the piezoelectricity of chiral polymers which do not belong to ferroelectrics does not appear as a result of ion polarization unlike ferroelectrics such as PVDF and PZT, and derives from a spiral structure which is a characteristics structure of molecules. Hence, the chiral polymers do not produce pyroelectricity produced by other ferroelectric piezoelectric bodies. It is therefore possible to obtain an output without an influence of a temperature change at a detection position and to precisely detect deformation of a housing without an influence caused by heat generation in the housing.

Further, the PVDF or the like shows a temporal fluctuation of a piezoelectric constant, and the piezoelectric constant is remarkably lowered in some cases. However, the piezoelectric constant of chiral polymers such as the PLLA is very stable temporarily. Furthermore, piezoelectric films made of PLLA and PVDF are polymers having flexibility, and therefore are not damaged by significant deformation unlike piezoelectric ceramics. Consequently, even when deformation is large, it is possible to reliably detect a deformation amount.

In addition, the piezoelectric film made of chiral polymers is transparent, and therefore the pressing sensor 15 may be provided closer to the side of the cover glass 11A than the display unit 14. In this case, the press detecting electrodes provided on the opposite surfaces of the piezoelectric film are also preferably transparent. For the press detecting electrodes, it is suitable to use inorganic electrodes such as ITO, ZnO, carbon nanotubes and graphene, and organic electrodes whose main component is polythiophene and polyaniline.

Figure 2:
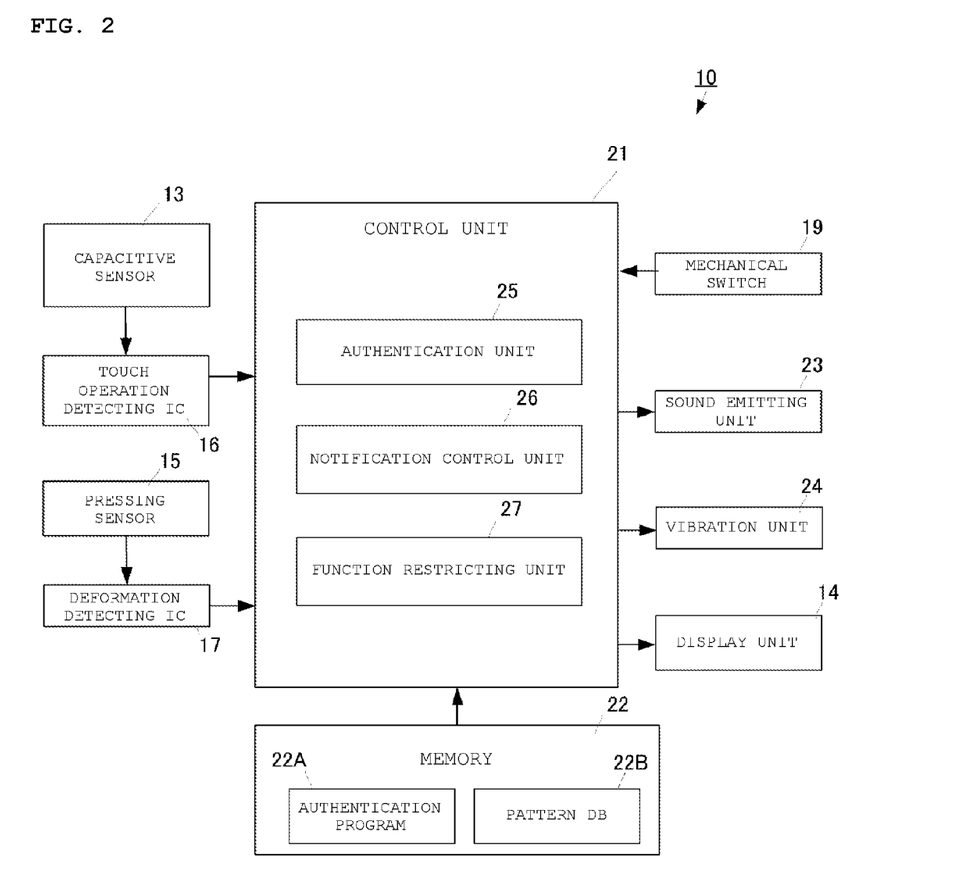
FIG. 2 is a functional block diagram of the mobile device according to the first embodiment of the present invention.

FIG. 2 is a functional block diagram of the mobile device 10 according to the first embodiment.

The mobile device 10 includes the above display unit 14, capacitive sensor 13, pressing sensor 15 and mechanical switch 19, as well as a control unit 21, a touch operation detecting IC 16, a deformation detecting IC 17, a memory 22, a sound emitting unit 23 and a vibration unit 24.

The control unit 21 is a functional block serving as a collective control function of an operating system and application software executed by a CPU (not illustrated) or the like and various hardware circuits such as an image processing circuit, an audio signal processing circuit and a communication circuit included in the mobile device 10.

The memory 22 stores an authentication program 22A and a pattern database 22B. The authentication program 22A is installed in the mobile device 10 and stored in the memory 22, and is read by the CPU (not illustrated) included as hardware in the mobile device 10 to cause the control unit 21 to execute authentication processing. The pattern database 22B is stored in the memory 22 by registration processing performed upon installation of the authentication program 22A, and is registered as a predetermined operation pattern related to a temporal change of a deformation amount of the housing 11.

The touch operation detecting IC (integrated circuit) 16 detects a touch operation based on a change in a capacitance of the capacitive sensor 13, generates information indicating whether or not the touch operation has been performed and coordinate information indicating where the touch operation has occurred, and outputs the information to the control unit 21.

The deformation detecting IC 17 detects a press of the operator's finger or the like on the cover glass 11A based on a change in electric charges of the pressing sensor 15, generates a signal proportional to a pressing force on the cover glass 11A, i.e., a signal proportional to the amount the cover glass 11A or the pressing sensor 15 has been deformed, and outputs the signal to the control unit 21.

The output of the pressing sensor 15 and the output of the deformation detecting IC 17 will now be described.

Figure 3:
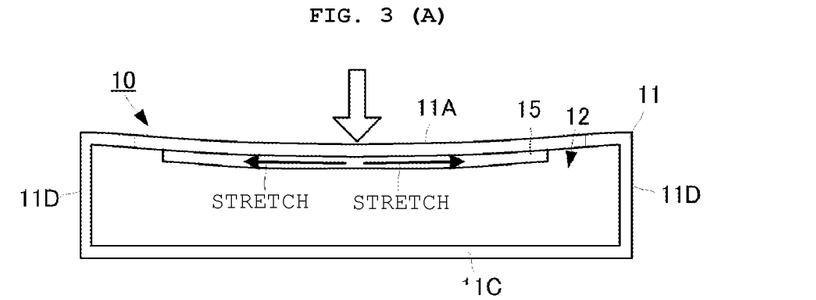
FIGS. 3(A), 3(B) and 3(C) are views illustrating a relationship between an output of a pressing sensor of the mobile device according to the first embodiment of the present invention, and an output of a deformation detecting IC.

FIG. 3(A) is a sectional view schematically illustrating a state where the cover glass 11A is pressed by a relative large force, and FIG. 3(B) is a sectional view schematically illustrating a state where the cover glass 11A is pressed by a relatively small force. The pressing sensor 15 is coupled to the cover glass 11A of the housing 11 (and the display unit 14 and the capacitive sensor 13 which are not illustrated), and is deflected together with the cover glass 11A. Hence, the pressing sensor 15 is deformed and stretched in the longitudinal direction shown in FIG. 3(A) when a center portion of the cover glass 11A is pressed. When the pressing force with respect to the cover glass 11A is relatively high, the amount the pressing sensor 15 is deformed is relatively large. When the pressing force of the cover glass 11A is relatively low, the deformation amount of the pressing sensor 15 is relatively small. When the deformation amount of the pressing sensor 15 changes, the polarized state of the pressing sensor 15 changes, so that a potential difference is produced between the press detecting electrodes provided on the opposite principal surfaces of the pressing sensor 15.

FIG. 3(C) is a view illustrating a relationship between an output of the pressing sensor 15 and an output of the deformation detecting IC 17 (the deformation amount of the pressing sensor 15).

The output of the pressing sensor 15 is a voltage obtained from electric charges produced on the opposite principal surfaces of the piezoelectric film from the press detecting electrodes provided on the opposite principal surfaces of the piezoelectric film. Generally, the voltage signals are each produced at a peak amplitude level (corresponding to the amount of the deformation of the pressing sensor 15) at a moment at which the deformation of the pressing sensor 15 is first initiated or when it is released, and the electric charges leak as a result of a piezoelectric effect. After deformation of the pressing sensor 15 is initiated, the amplitude level lowers rapidly. Similarly, after the deformation of the pressing sensor 15 is released, the amplitude level of the output of the pressing sensor reduces rapidly. The polarity of the voltage produced reverses between a moment at which the cover glass 11A is pushed (deformed) and a moment at which the push of the cover glass 11A is released.

The deformation detecting IC 17 outputs a voltage signal which reflects a temporal change of the deformation amount of the pressing sensor 15 based on the output of the pressing sensor 15. Hence, the deformation detecting IC 17 detects an output of the pressing sensor 15 (peak amplitude level) at a moment at which the deformation of the pressing sensor 15 has changed, generates a square wave signal for maintaining a fixed amplitude level proportional to the peak amplitude level, and outputs the square wave signal to the control unit 21. In addition, to more securely detect the peak amplitude level of the pressing sensor 15, the deformation detecting IC 17 slows a decrease speed of the amplitude level by using a detection circuit having a high input impedance or increases a sampling rate for sampling an output of the pressing sensor 15.

The mobile device 10 illustrated in FIG. 2 recovers power supply to each hardware in a state (pause state) where the power supply to each hardware is at least partially turned off and under conditions that the mobile device 10 receives a predetermined operation, and switches the pause state to an operation state. Upon this switching from this pause state to the operation state, the control unit 21 performs authentication processing of temporarily restricting an operation related to a predetermined function [please provide an example] and lifting the restriction on this operation.

As shown in FIG. 2, the control unit 21 includes at least an authentication unit 25, a notification control unit 26 and a function restricting unit 27 (all realized using software). The function restricting unit 27 temporarily restricts the operation related to the predetermined function upon the switching from the pause state to the operation state. To lift the restriction on the operation placed by the function restricting unit 27, the authentication unit 25 extracts from an output of the deformation detecting IC 17 a pattern (operation pattern) related to a temporal change of the deformation amount produced in the housing 11 by changing the degree of a force with which the operator grips the housing 11, and performs authentication based on whether or not the pattern of that changing force corresponds to a pattern (registered pattern) registered in the pattern database 22B. The notification control unit 26 causes at least one of the sound emitting unit 23, the vibration unit 24 and the display unit 14 to emit a sound, vibrate or change an indication so as to notify the operator of a time interval during which he or she can input the authentication pattern by appropriately deforming one or more surfaces of the housing.

Hereinafter, a specific example of an operation and control upon activation of the mobile device 10 will be described with respect to FIGS. 4(A)-4(D) and FIG. 5.

Figure 4:
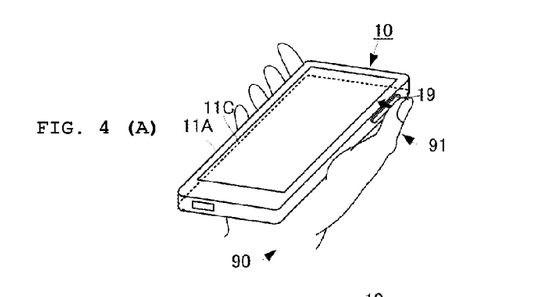
FIGS. 4(A), 4(B), 4(C) and 4(D) are views illustrating an operation example of the mobile device according to the first embodiment of the present invention.

The mobile device 10 switches from the pause state to the operation state when the mechanical switch 19 is pushed (pushed for a predetermined period of time) in the pause state as illustrated in FIG. 4(A). At this time, in the control unit 21, the function restricting unit 27 begins operation and restricts other operations of the control unit 21 except for operations of the function restricting unit 27, the notification control unit 26 and the authentication unit 25 (FIG. 5: S101).

Figure 5:
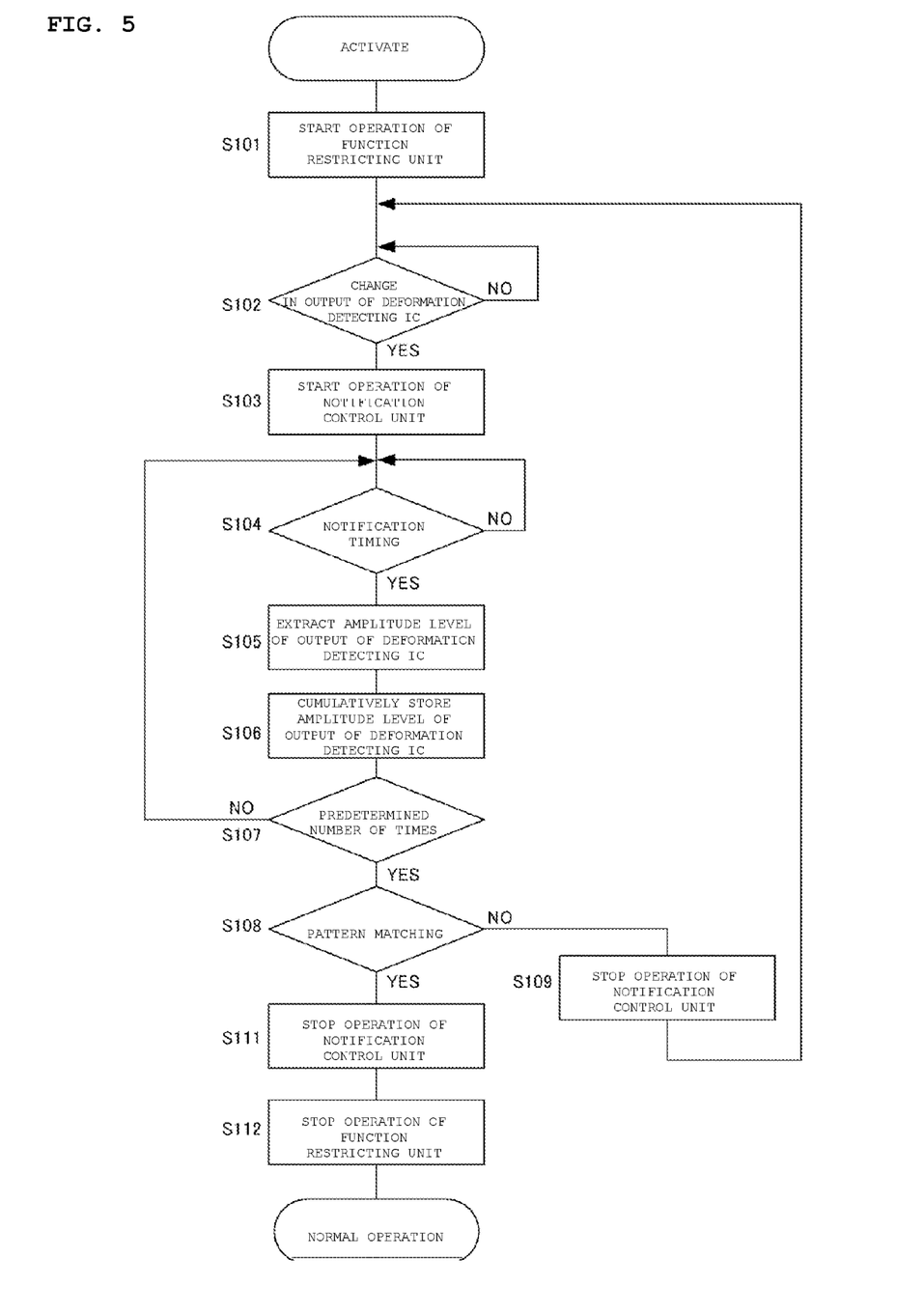
FIG. 5 is a chart illustrating an example of a control flow of the mobile device according to the first embodiment of the present invention.

Next, the notification control unit 26 stands by until an output from the pressing sensor 15 changes (FIG. 5: S102).

When the operator moves his or her finger 91 to the upper surface of the cover glass 11A while gripping the mobile device 10 by his or her hand 90, and uses his or her finger (in the illustrated case his or her thumb) to press the upper surface of the cover glass 11A with a relatively small force as illustrated in FIG. 4(B), the output from the pressing sensor 15 changes.

Then, the notification control unit 26 begins operation and starts outputting a notification control signal (see FIG. 4(D)) for notifying the operator of a time interval at which an input pattern entered by the operator is extracted from the output of the deformation detecting IC 17 (FIG. 5: S103). To this end, at least one of the sound emitting unit 23, the vibration unit 24 and the display unit 14 emits a sound, vibrates or changes an indication at a notification timing according to the notification control signal. Alternatively, the notification control unit 26 may start outputting the notification control signal at the same time at which the function restricting unit 27 starts operating.

Thus, in a state where sound emission, vibration or a change of an indication is repeated at a fixed time interval from the mobile device 10, the operator changes the degree of the force he or she uses to press the cover glass 11A according to the notification timing as illustrated in FIG. 4(C).

Thus, the output of the pressing sensor 15 changes, and an output signal from the deformation detecting IC 17 to the control unit 21 changes.

Then, the authentication unit 25 classifies the level of the output signal at each notification control signal from the deformation detecting IC 17 by comparing it to predetermined first and second threshold levels (FIG. 4(D)). If the output signal is less than the first threshold, it is registered as a 0. If it is between the first and second thresholds, it is registered as a 1. If it is greater than the second threshold, it is registered as a 2. See FIG. 5, S104-S105. The resultant sequence is then compared to the Memory Registered Pattern to determine if the correct input pattern has been applied and therefore whether or not the authentication should be accepted. More particularly, the authentication unit 25 cumulatively stores in the memory 22 the most recently extracted amplitude level together with previously extracted amplitude levels (FIG. 5: S106). When the number of extracted amplitude levels reaches a predetermined number, the authentication unit 25 determines by way of pattern matching whether or not a pattern (operation pattern) related to a temporal change of the amplitude levels cumulatively stored in the memory 22 corresponds to a pattern (registered pattern) registered in advance in the pattern database 22B (FIG. 5: S107→S108).

Further, when the authentication unit 25 makes negative determination that the operation pattern does not correspond to the registered pattern, it is regarded that the operator has not been authenticated. Thus, the notification control unit 26 stops outputting the notification control signal (FIG. 5: S109), and returns to a state where the notification control unit 26 stands by until the output from the pressing sensor 15 changes (FIG. 5: S102). Thus, the function restricting unit 27 keeps the restriction on the operation of the control unit 21.

Meanwhile, when the authentication unit 25 makes affirmative determination that the operation pattern corresponds to the registered pattern, it is regarded that the operator has been authenticated. Thus, the notification control unit 26 stops operating and stops an output of the notification control signal (FIG. 5: S111), and the function restricting unit 27 stops operating and lifts the restriction on the operation on the control unit 21 (FIG. 5: S112). Thus, the control unit 21 operates normally, so that, for example, it is possible to control an operation of each application software.

As described above, in the mobile device 10 according to the present embodiment, in the authentication processing performed by the control unit 21 to temporarily restrict operations related to predetermined functions and lift the restriction on the operations, the operator can undergo authentication by changing the degree of a force with which he or she presses down on the cover glass 11A while keeping his or her finger in contact with the cover glass 11A. Consequently, it is not imperative that the operator move his or her finger along the surface of the cover glass 11A or lift his or her finger along the surface of the cover glass 11A when undergoing authentication. Consequently, it is possible to prevent another person from reading an operation pattern based on the motion of his or her finger. Further, a position along the cover glass (more generally the position along the housing 11) which the finger of the operator needs to touch when undergoing authentication is not limited. Finally, it is not necessary to provide an indication for guiding the position of the finger on the mobile device 10.

In addition, in the present embodiment, a temporal change of a deformation amount (an amplitude level of an IC output) of the housing 11 is used for authentication. Consequently, it is possible to enhance a security level of the authentication processing compared to a case where only whether or not the housing 11 is temporarily deformed is used for authentication. In this regard, instead of the temporal change of the deformation amount of the housing 11, only whether or not the housing 11 is temporarily deformed may be used for authentication.

Further, in the present embodiment, an example where the pressing sensor 15 is formed by a piezoelectric film made of chiral polymers has been described. However, it is also possible to use other piezoelectric materials having pyroelectricity by using in combination a circuit which compensates for pyroelectricity.

Further, the mobile device 10 is not limited to a smartphone terminal, and components such as the above display unit 14, cover glass 11A, capacitive sensor 13 and mechanical switch 19 are not indispensable.

Next, a mobile device according to a second embodiment of the present invention will be described. The mobile device according to the present embodiment is a mobile router terminal having a size can be gripped by an operator.

Figure 6:
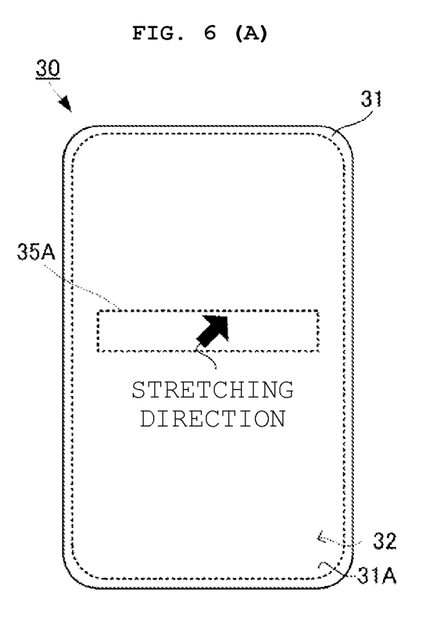
FIGS. 6(A) and 6(B) are a plan view and a side view, respectively, of a mobile device according to a second embodiment of the present invention.

FIG. 6(A) is a plan view of the mobile device according to the second embodiment of the present invention.

FIG. 6(B) is a side view of the mobile device according to the second embodiment of the present invention.

A mobile device 30 includes a housing 31 and pressing sensors 35A and 35B.

The housing 31 has a rectangular flat shape, has an internal space and includes a front plate 31A and a back plate 31B. The pressing sensor 35A is provided on a back surface of the front plate 31A. The pressing sensor 35B is provided on a front surface of the back plate 31B. The pressing sensors 35A and 35B deform in response to a push of the front plate 31A and the back plate 31B by an operator's finger, and produces electric charges between press detecting electrodes.

Figure 7:
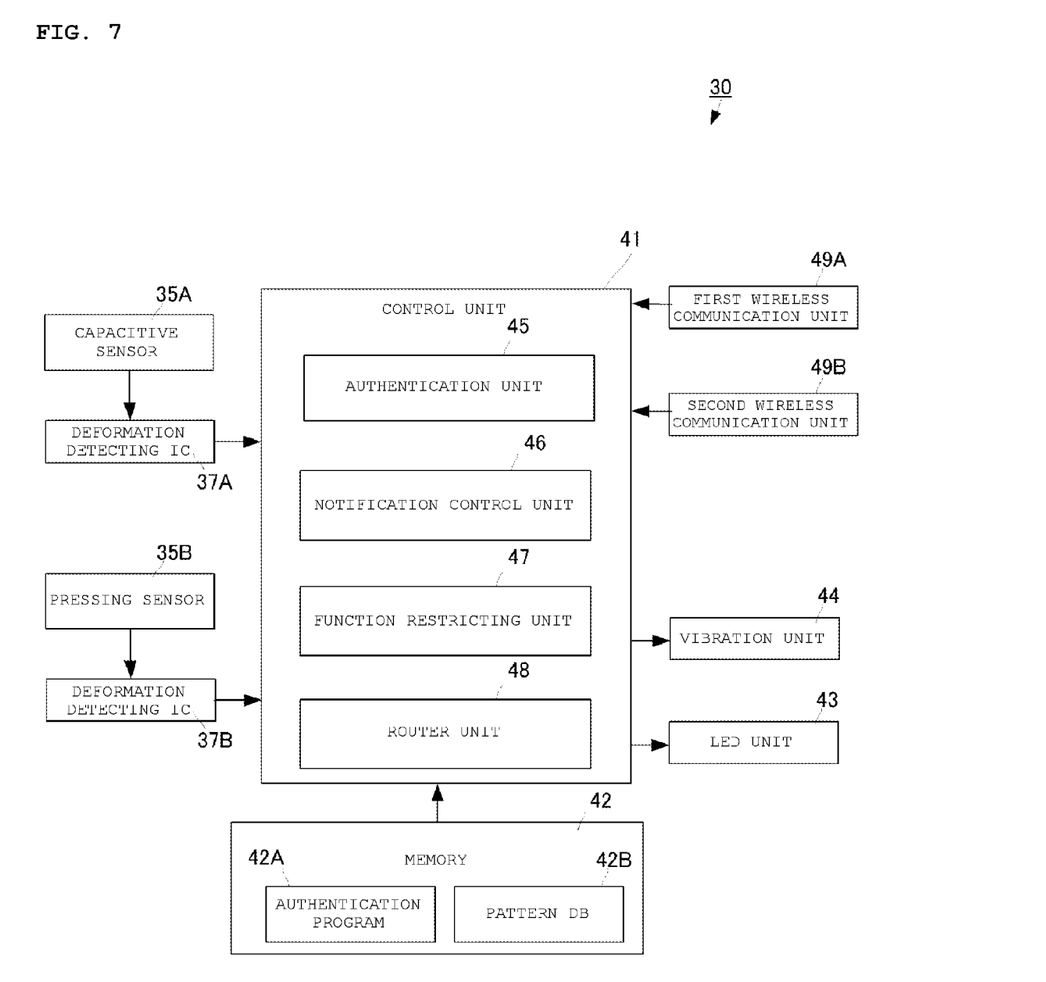
FIG. 7 is a functional block diagram of the mobile device according to the second embodiment of the present invention.

FIG. 7 is a functional block diagram of the mobile device 30 according to the second embodiment.

The mobile device 30 includes the above pressing sensors 35A and 35B and, in addition, a control unit 41, deformation detecting ICs 37A and 37B, a memory 42, a vibration unit 44, a LED unit 43, a first wireless communication unit 49A and a second wireless communication unit 49B. The control unit 41 includes a router unit 48. The first wireless communication unit 49A performs first wireless communication via a mobile telephone communication network or the like. The second wireless communication unit 49B performs second wireless communication via a wireless LAN communication network or the like. The router unit 48 executes a router function of routing a communication signal between the first wireless communication unit 49A and the second wireless communication unit 49B upon a normal operation of the control unit 41. The LED unit 43 emits light to indicate a charging state or an execution state of the router function as an internal state of the mobile device 30. The memory 42 stores an authentication program 42A and a pattern database 42B. The deformation detecting ICs 37A and 37B detect a pressing force of a finger or the like on the front plate 31A or the back plate 31B as a force proportional to a peak amplitude level of respective outputs of the pressing sensors 35A and 35B, and outputs the pressing force to the control unit 41.

This mobile device 30 switches from a pause state to an operation state when the housing 31 in the pause state receives a predetermined operation. Upon the switching from this pause state to the operation state, the control unit 41 performs authentication processing of temporarily restricting an operation related to a router function and lifting the restriction on this operation.

Hence, the control unit 41 further includes an authentication unit 45, a notification control unit 46 and a function restricting unit 47. The function restricting unit 47 temporarily restricts operations of the router unit 48, the first wireless communication unit 49A and the second wireless communication unit 49B upon the switching from the pause state to the operation state. The authentication unit 45 extracts from outputs of the deformation detecting ICs 37A and 37B a pattern (operation pattern) related to a temporal change of the deformation amount produced in the housing 31 by changing the degree of a force of the operator to grip the housing 31 when the restriction on the operation placed by the function restricting unit 47 is lifted, and performs authentication based on the determination whether or not a pressing pattern inputted by the operator corresponds to a pattern (registered pattern) registered in advance in the pattern database 42B. The notification control unit 46 causes the vibration unit 44 to vibrate to notify the operator of a time interval at which the pressing pattern is extracted from the outputs of the deformation detecting ICs 37A and 37B when the authentication unit 45 performs authentication.

Consequently, the mobile device 30 according to the present embodiment can also undergo authentication only by changing the degree of operator's inputted pressing force while keeping the operator's finger in contact with the front plate 31A or the back plate 31B, and there is no concern that an operation pattern is read by another person based on a motion of the operator's finger. Further, the mobile device 30 does not need to provide an indication for guiding a finger position for the operator since the operator does not need to move the finger. Consequently, the mobile device 30 such as a mobile router terminal from which costly members such as a display unit and a touch panel are removed can perform authentication processing. Further, in the mobile device 30, the two pressing sensors 35A and 35B are disposed on the top and the back of the housing 31. Consequently, the operator does not need to grip the top and the back of the housing 31 when undergoing authentication, and can avoid the need to check which is the front surface and which is the back surface of the housing 31. Consequently, for example, the operator can undergo authentication while the mobile device 30 in his or her pocket.

In addition, similar to the present embodiment, when two pressing sensors are provided to detect deformations of a respective front and back surfaces of a housing, authentication processing may be performed by using some conditions such as conditions that, for example, a signal level exceeds a threshold first, selecting a signal from which deformation of one of the front and the back surfaces of the housing has been detected, and using only this signal. Further, authentication processing may be performed by synthesizing signals from which deformations of the respective top and back of the housing have been detected, and using the synthesized signal.

Furthermore, a configuration where the two pressing sensors are provided on the front and the back of the housing is not limited to a configuration according to the second embodiment, and may be employed in the first embodiment. Still further, in the first embodiment, a router function (e.g. tethering function) may be realized by providing a router unit or the like, and restriction on an operation related to the router function, and authentication processing may be executed.

Figure 8:
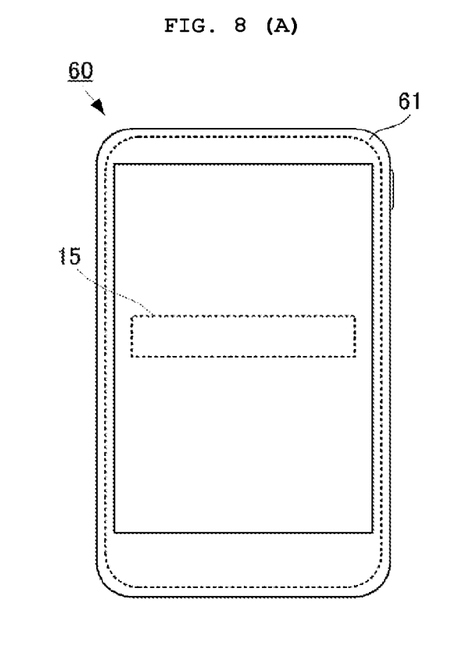
FIGS. 8(A) and 8(B) are a plan view and a side view, respectively, of a mobile device according to a third embodiment of the present invention.

Next, a mobile device according to a third embodiment of the present invention will be described. FIG. 8(A) is a plan view of the mobile device according to the third embodiment of the present invention. FIG. 8(B) is a side view of the mobile device according to the third embodiment of the present invention.

A mobile device 60 according to the third embodiment includes a housing 61, a display unit 64 and a capacitive sensor 63 similar to the first embodiment. In this regard, in the mobile device 60, a pressing sensor is not provided on the display unit 64 and the capacitive sensor 63, and a pressing sensor 65 is provided to a back plate 62C of the housing 61.

The pressing sensor 65 may be provided on the housing 61 as described above. In this case, too, an operator can undergo authentication by changing the degree of pressing force while keeping his or her finger in contact with the back plate 62C of the housing when undergoing authentication.

Figure 9:
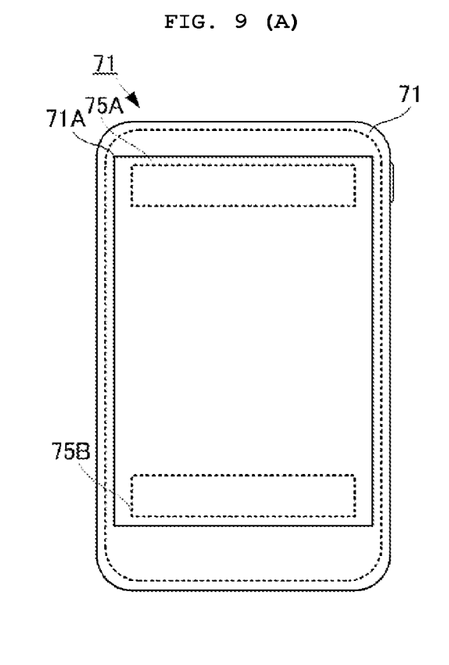
FIGS. 9(A) and 9(B) are a plan view and a side view, respectively, of a mobile device according to a fourth embodiment of the present invention.

Next, a mobile device according to a fourth embodiment of the present invention will be described. FIG. 9(A) is a plan view of the mobile device according to the fourth embodiment of the present invention. FIG. 9(B) is a side view of the mobile device according to the fourth embodiment of the present invention.

A mobile device 70 according to the fourth embodiment is a smartphone terminal which includes a housing 71 and a touch panel 72 similar to the first embodiment. The touch panel 72 described herein includes a display unit 73, a capacitive sensor 74 and pressing sensors 75A and 75B. The pressing sensors 75A and 75B are disposed such that the pressing sensors 75A and 75B extend along pairs of short sides of the display unit 74 and the capacitive sensor 73, respectively.

The pressing sensors 75A and 75B may be provided to the housing 71 as described above. In this case, too, an operator can undergo authentication by changing the degree of force that he or she presses the cover glass 71 keeping his or her finger in contact with the cover glass 71A of the housing 71 when undergoing authentication.

Figure 10:
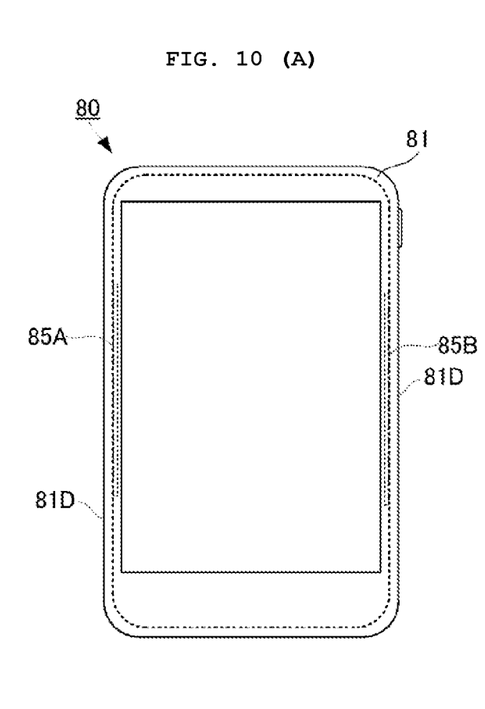
FIGS. 10(A) and 10(B) are a plan view and a side view, respectively, of a mobile device according to a fifth embodiment of the present invention.

Next, a mobile device according to a fifth embodiment of the present invention will be described. FIG. 10(A) is a plan view of the mobile device according to the fifth embodiment of the present invention. FIG. 10(B) is a side view of the mobile device according to the fifth embodiment of the present invention.

A mobile device 80 according to the fifth embodiment is a smartphone terminal which includes a housing 81, a display unit (not illustrated) and a capacitive sensor (not illustrated) similar to the first embodiment. In this regard, in the mobile device 80, a pressing sensor is not provided to the display unit and the capacitive sensor, and pressing sensors 85A and 85B are provided to a pair of opposing side plates 81D of the housing 81, respectively.

The pressing sensors 85A and 85B may be provided to the housing 81 as described above. In this case, too, an operator can undergo authentication by changing the degree of a force while keeping a finger in contact with the side plates 81D of the housing when undergoing authentication.

As described in each embodiment, the present invention can detect deformation of the housing in any way as long as the present invention is a mobile device which performs authentication by using a deformation detecting unit.

The invention claimed is:

1. A mobile device, comprising:
a housing;
at least one sensor for detecting a sequence of pressing forces on one or more surfaces of the housing:
means for:
providing a user with an indication of a plurality of distinct time intervals during which the user can press the one or more surfaces with a desired pressing force;
detecting the level of pressing force applied to the one or more surfaces of the housing during a plurality of the time intervals and determining an input pressing pattern as a function thereof; and
determining whether the input pressing pattern corresponds to a stored authenticating pressing pattern.

2. The mobile device according to claim 1, wherein the indication is a visual indication.

3. The mobile device according to claim 1, wherein the indication is an audio indication.

4. The mobile device according to claim 1, wherein the indication is a tactile indication.

5. The mobile device according to claim 1, wherein the time intervals are consecutive time intervals.

6. The mobile device according to claim 1, wherein each indication indicates the beginning of a respective one of the time intervals.

7. The mobile device according to claim 1, wherein the means determines the pressing pattern by classifying the pressing force applied to the one or more surfaces of the housing during each respective time interval as falling within a respective one of a plurality of categories.

8. The mobile device according to claim 7, wherein the plurality of categories is three categories.

9. The mobile device according to claim 1, wherein:
the housing includes front and rear main surfaces and at least two side surfaces connecting the front surface to the rear surface; and
the at least one sensor detects the pressing forces applied to two or more of the surfaces.

10. The mobile device according to claim 1, wherein:
the housing includes front and rear main surfaces and at least two side surfaces connecting the front surface to the rear surface; and
the at least one sensor detects the pressing forces applied to the front and rear surfaces.

11. The mobile device according to claim 1, wherein:
the housing includes front and rear main surfaces and at least two side surfaces connecting the front surface to the rear surface; and
the at least one sensor detects the pressing forces applied to two of the side surfaces which are opposed to one another.

12. The mobile device according to claim 1, wherein the at least one sensor includes a piezoelectric film which deforms in response to the pressing forces applied to one or more of the surfaces of the housing and the piezoelectric film is made of a chiral polymer.

13. The mobile device according to claim 1, wherein the means further restricts the operation of the mobile device until the input pressing pattern is determined to correspond to the stored pressing pattern.

14. The mobile device according to claim 13, where the function of the device is restricted to operations associated with the entry of the pressing pattern and the determination of whether the input pattern corresponds to the stored pressing pattern.

15. The mobile device according to claim 13, wherein the mobile device further comprises:
a first wireless communication unit which performs a first wireless communication;
a second wireless communications unit which performs a second wireless communication; and
a router which routes a communication signal between the first and second wireless communication units;
and wherein the means initially restricts operations of the first and second wireless communication units and the router and lifts the restrictions when the input pressing pattern is determined to correspond to the stored pressing pattern.

16. A non-transitory computer readable medium having a program stored thereon which, when run on a processor associated with a mobile device having housing, at least one sensor for detecting a pressing force applied to one or more surfaces of the housing and a memory storing an authenticating pressing pattern, causes the processor to:
provide a user with an indication of a plurality of distinct time intervals during which the user can press the one or more surfaces with desired pressing force;
detect the level of pressing force applied to the one or more surfaces of the housing during a plurality of the time intervals and determining an input pressing pattern as a function thereof; and
determine whether the input pressing pattern corresponds to a stored authentication pressing pattern.

17. The non-transitory computer readable medium according to claim 16, wherein the program determines the pressing pattern by classifying the pressing force applied to the one or more surfaces of the housing during each respective time interval as falling within a respective one of a plurality of categories.

18. The non-transitory computer readable medium according to claim 17, wherein the plurality of categories is three categories.

19. The non-transitory computer readable medium according to claim 16, wherein the time intervals are consecutive time intervals.

* * * * *